Inventor: Gordon Victor Smith
By Baldwin Wight Dieter & Brown
Attorneys

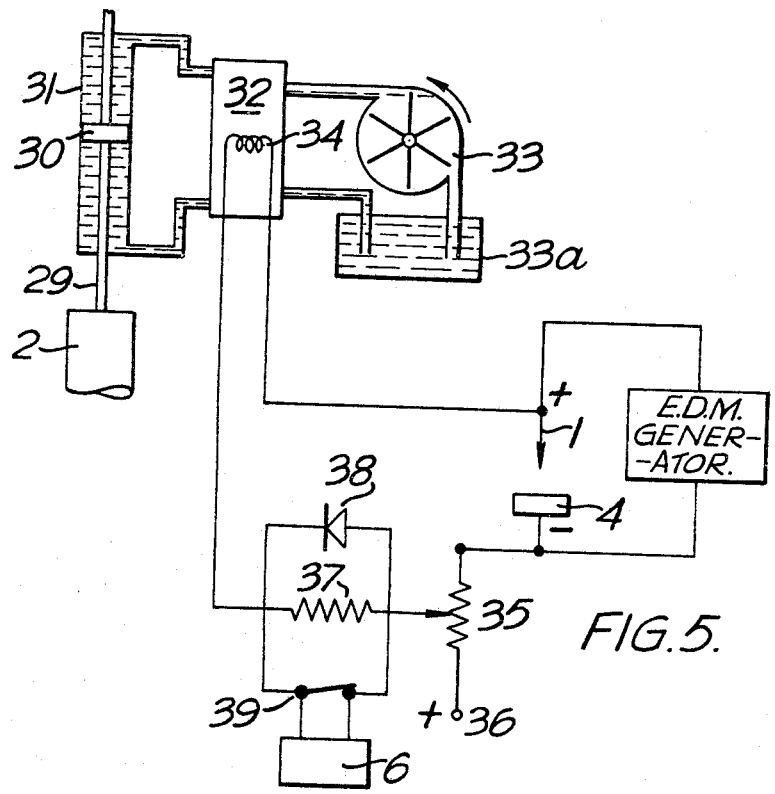
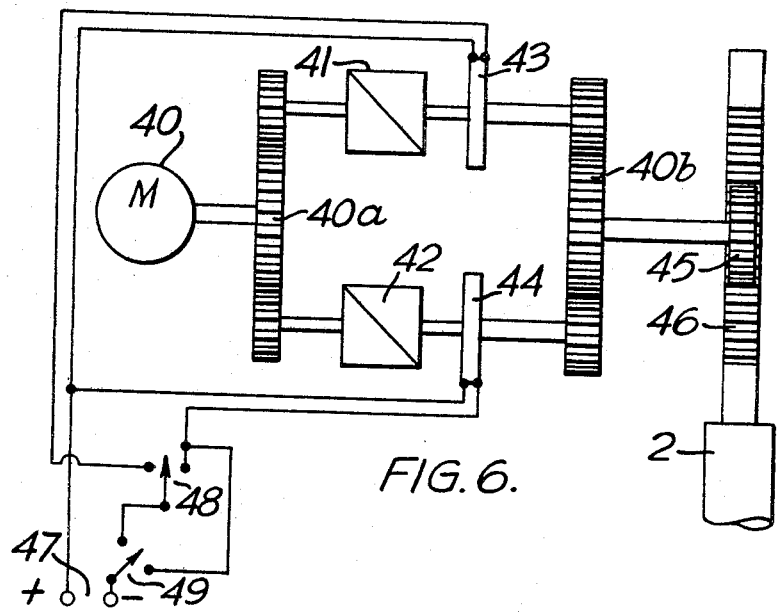

United States Patent Office 3,510,620
Patented May 5, 1970

3,510,620
METHOD AND APPARATUS RELATING TO SPARK-EROSION MACHINES PROVIDING SHORT-REMOVING RAPID ELECTRODE MOVEMENT
Gordon Victor Smith, Highnam, England, assignor to Sparcatron Limited, Stafford, Staffordshire, England, a corporation of the United Kingdom
Filed Aug. 7, 1967, Ser. No. 658,732
Claims priority, application Great Britain, Aug. 12, 1966, 36,218/66
Int. Cl. B23p 1/14
U.S. Cl. 219—69
13 Claims

ABSTRACT OF THE DISCLOSURE

A method and means for controlling relative movement between the electrode and the workpiece in a spark erosion machine wherein, before the electrode is moved away from the workpiece, the position thereof is registered and the return movement of the electrode to its registered position is carried out at two different speed rates to avoid over-running of the electrode.

---

Figure 1:
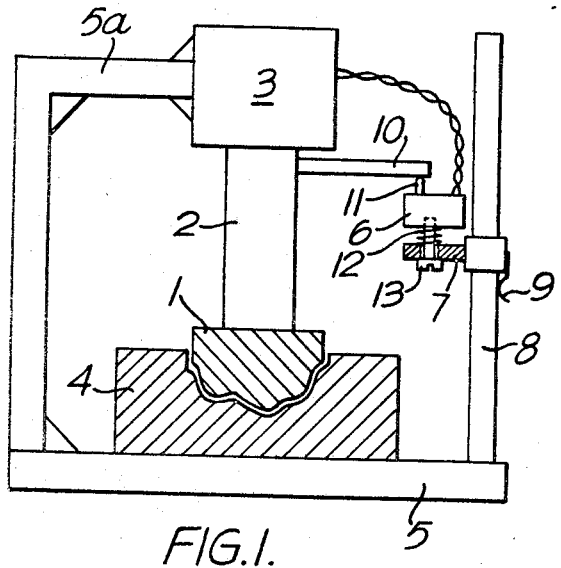

This invention relates to electrical discharge machining apparatus commonly known as spark erosion machines.

During normal electrical discharge machining there is a working gap between the electrode and workpiece which, generally, can be of the order of .002". Inevitably, as machining progresses, particularly where the workpiece is of large surface area, the swarf and carbon produced becomes lodged between the electrode and the workpiece causing an electrical short-circuit across the working gap. The swarf and carbon deposits may be cleared quickly by the flushing action of the dielectric fluid but it is very often necessary to raise the electrode to ensure satisfactory clearance of the deposits.

During the period of time when the electrode is being raised and lowered again to the working position, no useful machining occurs since the gap cannot be broken down by the electrical pulses applied thereto. For maximum machining efficiency it is therefore necessary that the raising and lowering operation of the electrode should be effected in the shortest possible time, i.e. the rate of travel of the electrode must be relatively high. With this object in mind, since normally the speed of downward travel of the electrode during a machining operation is relatively low, it would be necessary, when it reaches the correct working position, to provide very high deceleration. In this case, if one is to avoid "over-running" of the working gap by the electrode which would result in further short-circuiting between the electrode and workpiece, both the machine structure and the electrode drive mechanism must be of very rigid construction and the drive mechanism must be very fast-acting. To achieve sufficiently high rigidity in the machine structure is difficult and costly, particularly where the electrode weighs several tons, and in many cases it is not feasible to build such a structure. Thus, the ideal solution to the problem has not, to date, been found practicable.

At least two attempts have been made to resolve the problem, one of which has been based on making the structure as rigid as is reasonably possible and maintaining the speed of travel of the electrode mechanism very low. This has the disadvantage that, for long periods after each short-circuit occurs, no machining is carried out since, during its return movement, the electrode is approaching the working position at a very slow rate.

In the second proposal, the structure is again made as rigid as possible but the maximum rate of travel of the electrode is high. This results in the disadvantage that the electrode tends to oscillate due to "over-run" of the working position and, again, the proportion of the total time in which useful machining is carried out is limited.

It is among the objects of the present invention to overcome or substantially reduce the disadvantages of known apparatus.

According to the present invention, in a spark erosion machine, there is provided a method of controlling relative movement between the workpiece and the electrode on the occurrence of a short-circuit therebetween, which comprises registering the position of the electrode or of the workpiece at the instant when the short-circuit occurs, increasing the gap between the workpiece and the electrode to effect clearance of the material causing the short-circuit, and decreasing the gap by causing relative movement between the workpiece and the electrode to return the electrode or the workpiece to its registered position, the said return movement being carried out at at least two different speed rates, the change in speed being dependent upon the registered position of the electrode or the workpiece.

According to a further feature of the invention, the method comprises initially moving the electrode towards the workpiece, or vice versa, at a high speed rate and reducing the speed rate when the electrode or the workpiece is a predetermined distance from its registered position.

It will be obvious that, since the size and the weight of the electrode and the workpiece can vary over a considerable range, the speed rates will also vary over a considerable range. However, as a general guide "high speed rate" means that speed at which, for example the electrode, is moving which, when the drive thereto is stopped, will cause the electrode-to-workpiece distance to oscillate due to flexure of the machine frame thus causing instability in the cutting process, and "reduced speed rate" means that speed at which, for example the electrode, is moving which, when the drive thereto is stopped, the electrode is halted without oscillation of the electrode-to-workpiece distance due to flexure of the machine frame.

According to the invention furthermore, there is provided a spark erosion machine having drive means for effecting relative movement between the electrode and a workpiece, which comprises a memory device to register th position of the electrode, or of the workpiece, at the instant when a short-circuit occurs between the electrode and the workpiece, and means operatively connecting the memory device with the drive means, wherein said drive means operates at at least two different speeds so that, in use, relative movement between the electrode and the workpiece is effected at two different speed rates, the change in speed being dependent upon the registered position of the electrode or the workpiece.

Thus, it will be understood that the memory device registers the relative positions of the electrode and the workpiece, i.e. the depth of penetration of the electrode into the workpiece.

Figure 2:
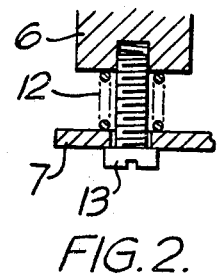
Figure 3:
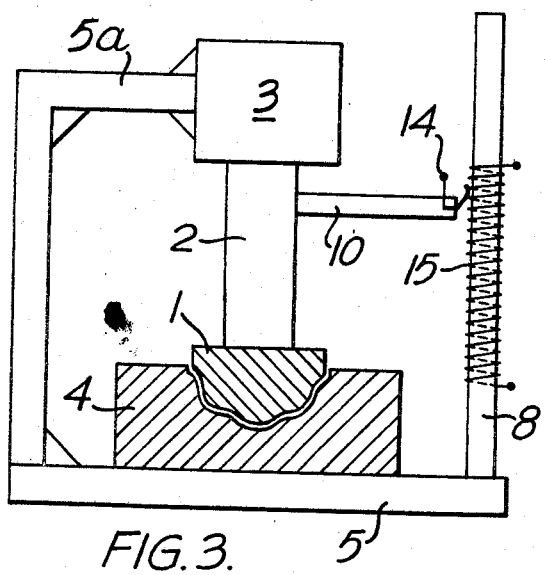
Figure 4:
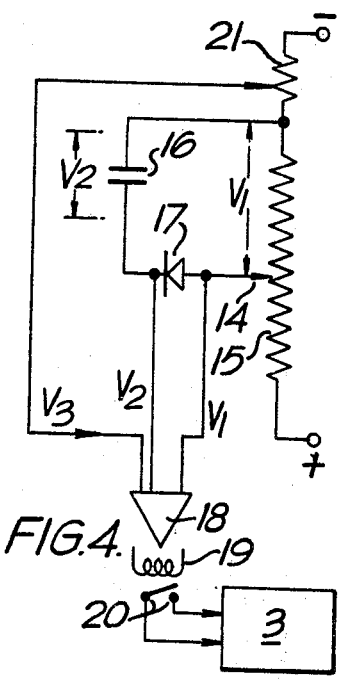

The invention is illustrated by way of example in the accompanying drawings, in which, FIG. 1 is a sectional elevation of a spark erosion machine incorporating the invention, FIG. 2 is a detail showing part of the memory device of FIG. 1, FIG. 3 is a sectional elevation of a spark erosion machine showing an alternative embodiment of the invention, FIG. 4 is an electrical diagram of the embodiment of FIG. 3, FIG. 5 is a schematic layout of one form of drive means, and FIG. 6 is a schematic layout of an alternative form of drive means.

Referring to FIG. 1 of the drawings, there is shown schematically a spark-erosion machine comprising an electrode 1 mounted on an electrode carrier 2 which is driven by a drive mechanism 3 towards or away from a workpiece 4 supported on a work-table 5. The drive mechanism 3 is supported on a fixed frame 5a.

A micro-switch 6 is attached to a mounting bracket 7 which is slidable on a vertical pillar 8 fixed to the work-table 5. A friction device, shown as a leaf-spring 9, prevents the mounting bracket 7 from moving on the pillar 8 under its own weight. An actuating arm 10, attached to the electrode carrier 2, is arranged to operate the plunger 11 of the micro-switch 6 as the electrode 1 moves downwards during a machining operation.

The micro-switch 6 is secured to the mounting bracket 7 by a screw 13, a coil spring 12 being interposed between the micro-switch 6 and the mounting bracket 7. Adjustment of screw 13 determines the extent of "over-travel" of the micro-switch, i.e. the distance it can be moved after engagement by the actuating arm before it engages the mounting bracket 7. Further downward movement of the electrode 1, and hence also of the arm 10, after spring 12 has been compressed, will cause the mounting bracket 7 to be moved downward on the pillar 8 against the friction spring 9.

The drive mechanism 3 is capable of operating at two different speed rates and the micro-switch 6 is electrically coupled to said drive mechanisms 3 to operate a speed-changing device whereby the speed of travel of the electrode 1 is high when the micro-switch is inoperative but low when it is operated.

The drive mechanism 3 may, as shown in FIG. 5, be electro-hydraulic and comprise a piston rod 29 connected to the electrode carrier 2, the piston rod having a piston 30 which is movable in a cylinder 31. A proportional electro-hydraulic valve 32 is in communication with the cylinder 31 and is supplied by fluid under pressure from a pump 33 and a reservoir 33a.

The coil 34 of the electro-hydraulic valve 32 is connected normally to a voltage derived simultaneously from a potentiometer 35 connected to a reference voltage 36 and from the voltage across the working gap between the electrode 1 and the workpiece 4.

An electrical resistance 37 is arranged in series circuit with the coil 34 together with a diode 38 which is connected in such manner that it will conduct current passing through the coil 34 in the sense to increase the electrode-to-workpiece gap, whereas it will provide a high impedance to current flow in an opposite sense, i.e. when causing the electrode to approach the workpiece. Connected in parallel with the resistance 37 and the diode 38 are contacts 39 coupled to the micro-switch 6, the contacts being arranged so that they are closed when the micro-switch 6 is not operated and opened when the micro-switch is operated. Thus, it will be seen that the current from the coil 34 is reduced when the micro-switch 6 is operated thereby providing a reduced speed rate of approach by the electrode 1 towards the workpiece 4.

In the alternative embodiment shown in FIG. 6, the drive mechanism is electro-mechanical and may comprise an electric motor 40 which is connected by means of gearing 40a to a gear box 41 of high ratio and a gear box 42 of lower ratio. The gear boxes 41 and 42 are connected, respectively, through electro-magnetic clutches 43 and 44, and through further gearing 40b, to a drive pinion 45. The pinion 45 is in mesh with a rack 46 to which the electrode carrier 2 is fixed so that, in operation, the electrode carrier 2 is raised or lowered according to the direction of rotation of the motor 40.

The electro-magnetic clutches 43, 44 are fed from a D.C. source 47 via a change-over switch 48. The switch 48 represents the contacts of the micro-switch 6 and is connected in series with a further switch 49 operated by rotation of the output shaft of the motor 40. The switches 48 and 49 are arranged so that when the motor 40 is driving in the direction to increase the electrode-to-workpiece gap, the D.C. supply 47 is connected to clutch 44, thus energizing the clutch and causing the pinion 45 to rotate at a high speed rate. When the motor 40 is driving in the opposite direction which is such as to cause the electrode-to-workpiece gap to decrease, current from the supply 47 passes via switch 48 in such manner that, if the micro-switch 6 is not operated, then the clutch 44 is energized thus causing the pinion 45 to rotate at a high speed rate. However, when the micro-switch 6 is operated, the switch 48 will cause operation of the clutch 43 so that the pinion 45 is caused to rotate at a lower speed rate. Thus, it will be appreciated that the approach speed of the electrode 1 to the workpiece 4 will be reduced.

In use, it will be seen that, during a normal machining operation, the actuating arm 10 is in engagement with the micro-switch 6 and the spring 12 thereof is fully compressed onto the mounting bracket 7. Thus, as machining progresses, the electrode 1 is being moved downwardly by the drive means at a low speed rate and this movement will cause the mounting bracket 7 to slide downwards on the pillar 8.

When a short-circuit occurs in the working gap between the electrode 1 and the workpiece 4 due to the build up of swarf and/or carbon deposits, the bracket 7 will remain stationary to register the position of the electrode 1, the micro-switch 6 will return to its released position under the action of the spring 12, and the drive means 3 will operate to raise the electrode to increase the working gap so that the obstruction can be properly removed.

The drive means 3 are then operated to return the electrode 1 to its working position as registered by the bracket 7. This movement is carried out at a high speed rate until the actuating arm 10 engages the micro-switch 6, the latter passing a signal to the drive means 3 so that the speed rate is reduced. To avoid "over-running" the working gap, the change in speed is effected at a predetermined distance from the registered position of the electrode 1, this distance being determined by the space between the micro-switch 6 and the bracket 7. Thus, the electrode 1 travels at a high rate until the arm 10 actuates the switch 6 when the speed is reduced, and thereafter the electrode travels at a slow rate until the spring 12 is compressed and the switch 6 engages the bracket 7 at which point the electrode is in its registered position. Further machining takes place with the electrode moving downwards at a slow rate and the bracket 7 moving therewith to register the position of the electrode at the next stoppage.

Thus, it will be appreciated that the memory register in this embodiment is provided by the mounting bracket 7 and its co-acting micro-switch 6.

In the alternative embodiment shown in FIGS. 3 and 4, the machine is basically the same, except that arm 10 carries an electrical wiper 14 which is in slidable contact with the winding of a linear potentiometer 15 attached to the pillar 8.

The ends of the potentiometer winding are connected to a D.C. supply via the winding of an additional small potentiometer 21 as shown in FIG. 4. A capacitor 16 is connected in series with a rectifier 17, and is positioned between the wiper 14 and one end of the potentiometer 15. As the electrode 1 descends during a machining operation, the capacitor voltage $V_2$ is equal to the output voltage $V_1$ of the potentiometer 15. When the electrode 1 is raised, due to a short-circuit between the electrode and work-piece, voltage $V_1$ reduces but, due to the presence of the rectifier 17, the capacitor voltage remains unchanged.

Voltages $V_1$ and $V_2$ are applied to the two inputs of a differential D.C. amplifier 18. This amplifier, which is of known design, has a very high input impedance so that the capacitor does not become discharged. A further adjustable voltage $V_3$ derived from the potentiometer 21 is also applied to the same amplifier input as $V_2$. Voltage $V_3$, which is negative with respect to both $V_2$ and $V_1$, is adjusted to have a value equal to the change in $V_1$ for, say .005″ movement of the electrode 1.

The output of amplifier 18 is arranged to operate a relay 19 having contacts 20 so that if $|V_1|<|V_2|-|V_3|$ the relay contacts 20 are closed, and if $|V_1|\geqslant|V_2|-|V_3|$ the relay contacts 20 are opened. Contacts 20 are then utilised in the same way as the contacts of the micro-switch 6 in the embodiment of FIG. 1 to operate a speed-changing device associated with drive mechanism 3.

It will be appreciated that the memory register in this embodiment is provided by the voltage of the capacitor 16. The "predetermined distance" defined in the embodiment of FIG. 1 by the space between the micro-switch 20 and the bracket 7 is, in this embodiment defined by voltage $V_3$.

Although it is not limited in this respect, the present invention may be applied to the apparatus described and claimed in prior British patent specifications Nos. 756,727, 780,242, 773,782, 812,012 and 1,004,907.

Although the invention has been described specifically with reference to the workpiece being stationary and the electrode being moved relative thereto, it will be understood that the electrode could remain stationary and the workpiece moved relative thereto.

What I claim is:

1. A method of controlling relative movement between an electrode in a spark-erosion machine and a workpiece on the occurrence of a short-circuit therebetween, which method comprises registering the relative position of one or other of said electrode or said workpiece with respect to the other at the instant when said short-circuit occurs, increasing the gap between said electrode and said workpiece to effect clearance of the material causing said short-circuit, subsequently decreasing said gap by causing relative movement at a first speed rate between said electrode and said workpiece until said electrode or said workpiece is at a predetermined distance from said relative position which was registered, and thereafter decreasing said gap by causing relative movement at a second speed rate, which is lower than said first speed rate, between said electrode and said workpiece to re-establish said relative position of said electrode or said workpiece with respect to the other.

2. The method as claimed in claim 1 which said workpiece remains stationary and said electrode is moved relative thereto.

3. A spark erosion machine which comprises support means for an electrode, support means for a workpiece, drive means having a first speed rate and a second speed rate for effecting relative movement between said electrode and said workpiece in a direction to decrease the distance therebetween, a memory device for registering the position of one or other of said electrode and said workpiece at an instant when a short-circuit occurs therebetween, and means for coupling said memory device with said drive means for changing speed of said drive means from said first speed rate to said second speed rate effective at a pre-determined distance from said registered position of said electrode or said workpiece.

4. A machine as claimed in claim 3, in which said memory device comprises a bracket slidably mounted on a vertically disposed pillar, said bracket being arranged operatively to co-operate with memory actuating means provided on a movable carrier operatively associated with said drive means.

5. A machine as claimed in claim 4, in which a micro-switch operatively connected to said drive means is mounted on said bracket and is actuated by said memory actuating means.

6. A machine as claimed in claim 5, in which a compression spring is arranged between said micro-switch and said bracket to provide, in said registered position, a predetermined space between said micro-switch and said bracket.

7. A machine as claimed in claim 6, in which an adjusting screw is provided between said micro-switch and said bracket whereby the said predetermined space can be varied.

8. A machine as claimed in claim 3, in which said memory device comprises a vertically disposed linear potentiometer, a movable carrier operatively associated with said drive means, said movable carrier being coupled to the electrical wiper element of said linear potentiometer, a rectifier device, a capacitor connected in series with said rectifier device and positioned between said wiper element and one end connection of said linear potentiometer, voltage across said capacitor providing a measure of said registered position, and means for comparing the voltage across said capacitor with voltage output of said linear potentiometer to control the operating speed of said drive means.

9. A machine as claimed in claim 8, in which said comparing means comprise a differential D.C. amplifier, the output of said D.C. amplifier being operative to control the operating speed of said drive means.

10. A machine as claimed in claim 9, in which the ends of said potentiometer winding are connected to a D.C. supply through a further resistance element having a potentiometer wiper element, the output voltage of said further resistance element also being passed to said D.C. amplifier and providing a signal which is operative to change said operating speed of said drive means at a predetermined distance from said registered position.

11. A machine as claimed in claim 10, in which the output of said D.C. amplifier is arranged to operate a relay, the contacts of said relay being operative to control said output speed of said drive means.

12. A machine as claimed in claim 3 in which said drive means comprise electro-hydraulic means.

13. A machine as claimed in claim 3, in which said drive means comprise electro-mechanical means.

References Cited
UNITED STATES PATENTS

| | | |
|---|---|---|
| 2,761,050 | 8/1956 | Ballhausen. |
| 2,984,761 | 8/1961 | Webb. |
| 3,370,147 | 2/1968 | Matulaitis. |

RALPH F. STAUBLY, Primary Examiner